(12) United States Patent
James et al.

(10) Patent No.: US 10,084,746 B2
(45) Date of Patent: *Sep. 25, 2018

(54) HIGH PERFORMANCE DNS TRAFFIC MANAGEMENT

(71) Applicant: VERISIGN, INC., Reston, VA (US)

(72) Inventors: Stephen Daniel James, South Riding, VA (US); Arunabho Das, Fairfax, VA (US)

(73) Assignee: VERISIGN, INC., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/948,916

(22) Filed: Nov. 23, 2015

(65) Prior Publication Data

US 2016/0080312 A1    Mar. 17, 2016

Related U.S. Application Data

(63) Continuation of application No. 13/839,554, filed on Mar. 15, 2013, now Pat. No. 9,197,487.

(51) Int. Cl.
| | |
|---|---|
| *G06F 17/30* | (2006.01) |
| *H04L 29/12* | (2006.01) |
| *H04L 12/24* | (2006.01) |
| *H04L 12/801* | (2013.01) |

(52) U.S. Cl.
CPC ......... *H04L 61/1552* (2013.01); *H04L 41/00* (2013.01); *H04L 47/10* (2013.01); *H04L 61/1511* (2013.01)

(58) Field of Classification Search
CPC ......... G06F 17/30424; G06F 17/30867; G06F 17/30477; G06F 17/30241
See application file for complete search history.

(56) References Cited

U.S. PATENT DOCUMENTS

| | | |
|---|---|---|
| 6,154,777 A | 11/2000 | Ebrahim |
| 7,725,536 B2 | 5/2010 | Douglis et al. |
| 2003/0009591 A1 | 1/2003 | Hayball et al. |

(Continued)

FOREIGN PATENT DOCUMENTS

WO    2012062382 A1    5/2012

OTHER PUBLICATIONS

Non-Final Office Action dated Oct. 30, 2015, U.S. Appl. No. 14/252,483, pp. 1-39.

(Continued)

*Primary Examiner* — Cam-Y Truong
(74) *Attorney, Agent, or Firm* — Artegis Law Group, LLP

(57) ABSTRACT

The present disclosure provides systems, methods, and products for high performance implementation of traffic management rules. In various embodiments, traffic management rules, such as DNS traffic management rules, are functionally expressed as rows in one or more lookup tables that are deployed to DNS resolution servers. The DNS resolution server uses the domain name, resource record type, traffic management rule types, and/or traffic management variable values to search for or look up an answer, from among multiple answers corresponding to the domain name and resource record type that meets the traffic management criteria. This look up is done without executing conventional traffic management code or scripts.

22 Claims, 7 Drawing Sheets

(56) References Cited

U.S. PATENT DOCUMENTS

| | | |
|---|---|---|
| 2003/0195984 A1 | 10/2003 | Zisapel et al. |
| 2004/0039798 A1 | 2/2004 | Hotz et al. |
| 2004/0210672 A1 | 10/2004 | Pulleyn et al. |
| 2005/0111384 A1 | 5/2005 | Ishihara et al. |
| 2005/0213572 A1* | 9/2005 | Huang ............... H04L 29/12009 370/389 |
| 2006/0192994 A1 | 8/2006 | Tanimoto |
| 2007/0204341 A1 | 8/2007 | Rand et al. |
| 2008/0077695 A1 | 3/2008 | Schmidt |
| 2008/0222306 A1 | 9/2008 | Bhakta et al. |
| 2009/0172192 A1 | 7/2009 | Christian et al. |
| 2009/0180377 A1* | 7/2009 | Sullivan ................. H04L 47/10 370/230 |
| 2010/0023611 A1 | 1/2010 | Yang et al. |
| 2010/0037314 A1 | 2/2010 | Perdisci et al. |
| 2010/0223364 A1 | 9/2010 | Wei |
| 2010/0228819 A1 | 9/2010 | Wei |
| 2010/0284411 A1 | 11/2010 | Mirani et al. |
| 2011/0022678 A1* | 1/2011 | Smith ................... G06F 21/552 709/215 |
| 2011/0035469 A1* | 2/2011 | Smith ............... H04L 29/12066 709/220 |
| 2011/0075675 A1 | 3/2011 | Koodli et al. |
| 2011/0137973 A1 | 6/2011 | Wei et al. |
| 2012/0117621 A1 | 5/2012 | Kondamuru et al. |
| 2012/0143982 A1 | 6/2012 | Oster et al. |
| 2012/0173684 A1 | 7/2012 | Courtney et al. |
| 2012/0191874 A1 | 7/2012 | Robinson et al. |
| 2012/0198065 A1 | 8/2012 | Sung |
| 2012/0303804 A1 | 11/2012 | Sundaram et al. |
| 2012/0321052 A1 | 12/2012 | Morrill et al. |
| 2013/0018944 A1 | 1/2013 | Shyamsunder et al. |
| 2013/0019311 A1 | 1/2013 | Swildens et al. |
| 2014/0036897 A1 | 2/2014 | Frydman et al. |
| 2014/0068043 A1 | 3/2014 | Archbold |
| 2014/0149601 A1 | 5/2014 | Carney et al. |
| 2014/0207835 A1* | 7/2014 | Jellick ................... H04L 41/082 707/827 |
| 2014/0280963 A1 | 9/2014 | Burbridge et al. |
| 2014/0282847 A1 | 9/2014 | Black et al. |
| 2015/0295882 A1 | 10/2015 | Kaliski, Jr. |

OTHER PUBLICATIONS

Final Office Action dated Feb. 26, 2016, U.S. Appl. No. 14/252,483, pp. 1-21.

Ballani et al., "Towards a global IP Anycast service", http://research.microsoft.com/en-us/um/people/hiballan/talks/talk-sigcomm05-pias.pdf, accessed Mar. 14, 2013, pp. 1-59.

M. Tariq Banday, "Recent Developments in the Domain Name System", International Journal of Computer Applications (0975-8887), vol. 31, No. 2, Oct. 2011, pp. 18-25.

Extended European Search Report dated Aug. 27, 2015, European Application No. 15163265.0, pp. 1-4.

Author Unknown, "What does a DNS request look like?", Server Fault, http://serverfault.comlquestions/173187/what-does-a-dns-request-look-like, Aug. 22, 2010, pp. 1-4.

C. Contavalli, "Client IP Information in DNS Requests", IETF, http://tools.ietf.org/pdf/draft-vandergaast-edns-client-ip-01.pdf, May 21, 2010, pp. 1-23.

Extended European Search Report dated Jun. 4, 2014, issued in European Application No. 14160024.7 filed Mar. 14, 2014, pp. 1-11.

* cited by examiner

Traffic management script 300
for "example.com"

Start: IF GEO of requestor = East of the Mississippi River THEN
    GOTO Load_Balance;
ELSE
    GOTO Fail_Over_212;

Load_Balance: IF Random Number <= 80 THEN
    GOTO Fail_Over_1;
ELSE
    GOTO Fail_Over_2;

Fail_Over_1: IF East Coast Server No. 1 = Up THEN
    IP_Address = 192.0.2.1; END.
ELSE
    GOTO Fail_Over_2;

Fail_Over_2: IF East Coast Server No. 2 = Up THEN
    IP_Address = 192.0.2.2; END.
ELSE
    GOTO Fail_Over_212;

Fail_Over_212: IF West Coast Server = Up THEN
    IP_Address = 203.0.113.1; END.
ELSE
    GOTO Fail_Over_213;

Fail_Over_213: IF East Coast Server No. 1 = Up THEN
    IP_Address = 192.0.2.1; END.
ELSE
    IP_Address = 192.0.2.2; END.

FIG. 3A

Load Balance Rule Table 410

| Domain Name | R Record Type | Site | Rule Type | Query % | Variant ID |
|---|---|---|---|---|---|
| example.com | A | East | Load Balance | 60.0 | 0 |
| example.com | A | West | Load Balance | 40.0 | 212 |

Resource Record Table 420

| Variant ID | Domain Name | R Record Type | IP Address | Default |
|---|---|---|---|---|
| 0 | example.com | A | 192.0.2.1 | Y |
| 0 | example.com | A | 192.0.2.2 | Y |
| 212 | example.com | A | 203.0.113.2 | N |
| 212 | example.com | A | 203.0.113.3 | N |

RRSIG Table 430

| Variant ID | RRSIG Record | Digest of IP Address Record Set |
|---|---|---|
| 0 | RRSIG Record 'a' 5 2 3600 20040509183619 | pAOtzLP2MU0tDjUwhOKESFPiiHm... |
| 212 | RRSIG Record 'b' 4 2 3600 20050509183620 | 6dhGYhYluzAAc0tDjUwhOqPPo34... |

FIG. 4

HIGH PERFORMANCE DNS TRAFFIC MANAGEMENT

CROSS-REFERENCE TO RELATED APPLICATIONS

This application is a continuation of U.S. patent application Ser. No. 13/839,554, filed Mar. 15, 2013, the contents of which are incorporated herein in their entirety.

FIELD OF THE INVENTION

This invention relates to network traffic management, and more particularly, to providing high speed responses to DNS queries that can provide more than one answer depending on traffic management criteria.

BACKGROUND

The Domain Name System ("DNS") is a hierarchical naming system for devices connected to the Internet. Its primary purpose is to translate human-friendly domain names (e.g., example.com) to the Internet Protocol ("IP") addresses used by devices connected to the Internet (e.g., 192.0.2.1). When a requestor makes a DNS request for IP address ("A" record) of a domain name (also known as a DNS query), such as when a user types in a domain name into their browser to find a specific Internet site, the DNS request is sent to a recursive DNS server, which in turn makes requests to a hierarchical system of servers until the authoritative DNS server for the domain name is located. The user's request is then sent to the authoritative DNS server, which responds with the IP address corresponding to the domain name. If an entry for the requested domain name is found (e.g., a DNS resource record), a DNS reply is issued to the requestor, and that reply contains the IP address of a server, or other resource, corresponding to the requested domain name. Using the IP address from the reply, the requestor's computer/browser can connect to the server hosting the web site associated with the requested domain name.

DNS traffic management relates to the selection, from among more than one choice for a given domain name, of a set of resource records to provide to the requestor in response to a DNS query. For example, consider a domain name (e.g., example.com) that has more than one server associated with it (e.g., an East coast web server that has IP addresses 192.0.2.1 and 192.0.2.2 and a West coast web server that has IP address 203.0.113.1), all of which host the website for that domain name. In this example, when an authoritative DNS server which supports traffic management receives a DNS query for the IP addresses associated with the domain name "example.com," it chooses and then returns one of the two answers (i.e., it returns either 192.0.2.1 and 192.0.2.2 or it returns 203.0.113.1 in this example). This choice is made according to the traffic management rules, criteria, or requirements specified for that domain name. The DNS can be used to store information other than IP addresses. For instance, it is possible to associate a domain name with a text value using TXT records. Each request includes both the type of information that should be returned ("A" for IPv4 addresses or "TXT" for generic text) and the domain name. The response will include an answer consisting of all resource records of the specified type associated with the given domain name. The traffic management described applies to all resource records types.

Because of the huge and quickly growing number of DNS queries that occur every minute of every day, and because of user expectations of minimal delay, the DNS system must provide IP addresses and other required information in response to DNS requests very quickly. Current DNS traffic management techniques and algorithms, however, slow response time because choosing which one of the multiple answers to return requires dynamically running or executing code or scripts for each domain name query. For complex traffic management decisions that are based on several factors (e.g., load balancing factors, cost factors, geographic location factors, etc.), and that involve the choice of several different answers, this can be especially time consuming as multi-section or multiple algorithms are executed to arrive at a final answer.

Similarly, any other processing that slows down the response time to DNS queries is also detrimental. For example, security processing, such as encrypting or digitally signing responses to DNS queries, is computation intensive and time consuming.

Accordingly, it is desirable to develop improved systems, methods and techniques for providing faster, more efficient, traffic management functionality for DNS query responses and for other processing associated with DNS query responses.

BRIEF SUMMARY

This disclosure provides embodiments of methods, systems, and articles of manufacturer for managing network traffic. Various embodiments of the methods, systems, and articles of manufacturer may perform operations including receiving a domain name and resource record type from a requestor and searching a table, using the domain name and resource record type as a search key, for traffic management rules. In various embodiments, the traffic management rules specify the value of a variable that affects the answer contained in the response. The next operations include determining a value for the variable based on the received request that affects the traffic management rule; searching the traffic management rules found in the first operation, using the value for the variable as a search key, for an answer corresponding to the domain name; and providing the answer to the requestor.

Various embodiments may also include means, steps, algorithms, and operations for also expressing a DNS traffic management rule as a row in the table, or for expressing a set of DNS traffic management rules as a plurality of rows in the table. Other variants also search the table, using the domain name as a search key and using a rule type as a search key, for a second traffic management rule—that is, the outcome of the first traffic management rule is a second traffic management rule. Still other variants may search the table for a plurality of resource records corresponding to the domain name; and provide the plurality of resource records to the requestor. One variant may include searching for IP addresses ("A" records). Another variant may include searching for text ("TXT" records). Yet other variants may search the table, using the value for the variable as a search key, for information corresponding to the domain name in addition to the IP address, and provide the information to the requestor.

Other variations that are not specific to the DNS system and to resource records are possible.

It is to be understood that both the foregoing general description and the following detailed description are exemplary and explanatory only and are not restrictive of the invention, as claimed.

Additional features, implementations, and embodiments consistent with the invention will be set forth in part in the description which follows, or may be learned by practice of the invention. The metes and bounds of the invention will be defined by means of the elements and combinations particularly pointed out in the appended claims.

BRIEF DESCRIPTION OF THE DRAWINGS

The accompanying drawings, which are incorporated in and constitute a part of this specification, illustrate embodiments of the invention and together with the description, serve to explain the principles of the invention. In the figures:

FIG. 3A is an example of a conventional script that implements traffic management rules;

FIG. 4 is another example of a set of traffic management tables, consistent with the principles of the invention;

DETAILED DESCRIPTION OF THE EMBODIMENTS

Reference will now be made in detail to exemplary embodiments of the invention, examples of which are illustrated in the accompanying drawings. Wherever convenient, the same reference numbers will be used throughout the drawings to refer to the same or like parts.

Various embodiments consistent with the invention provide systems, methods, and computer program products for representing traffic management algorithms, procedures, operations, logic, or techniques (collectively referred to as rules) in look-up tables, such that a domain name server can quickly and efficiently produce the correct answer for a given domain name and resource record type according to traffic management requirements, without having to execute traffic management code, scripts, or the like to implement the traffic management requirements. In various embodiments, an answer may be an IP address ("A" resource record type) or text ("TXT" resource record type). In some embodiments, information in addition to the answer, such as a corresponding digital signature, may be stored, looked up, and returned with the answer.

Various herein described embodiments, and other embodiments consistent with the invention, may express the DNS traffic management requirements or rules for each zone as rows within a set of data tables or lookup tables, and the set of data tables may be deployed in each instance of the resolution server at each resolution site. Embodiments consistent with the invention provide a significant performance advantage over existing DNS traffic management techniques in that they greatly reduce the computation workload of the resolution server when responding to a DNS query. This is because instead of executing traffic management code, logic, or scripts, the transaction involves looking up or searching for the relevant table rows that correspond to the traffic management criteria of the domain name specified by the DNS query.

Figure 1:
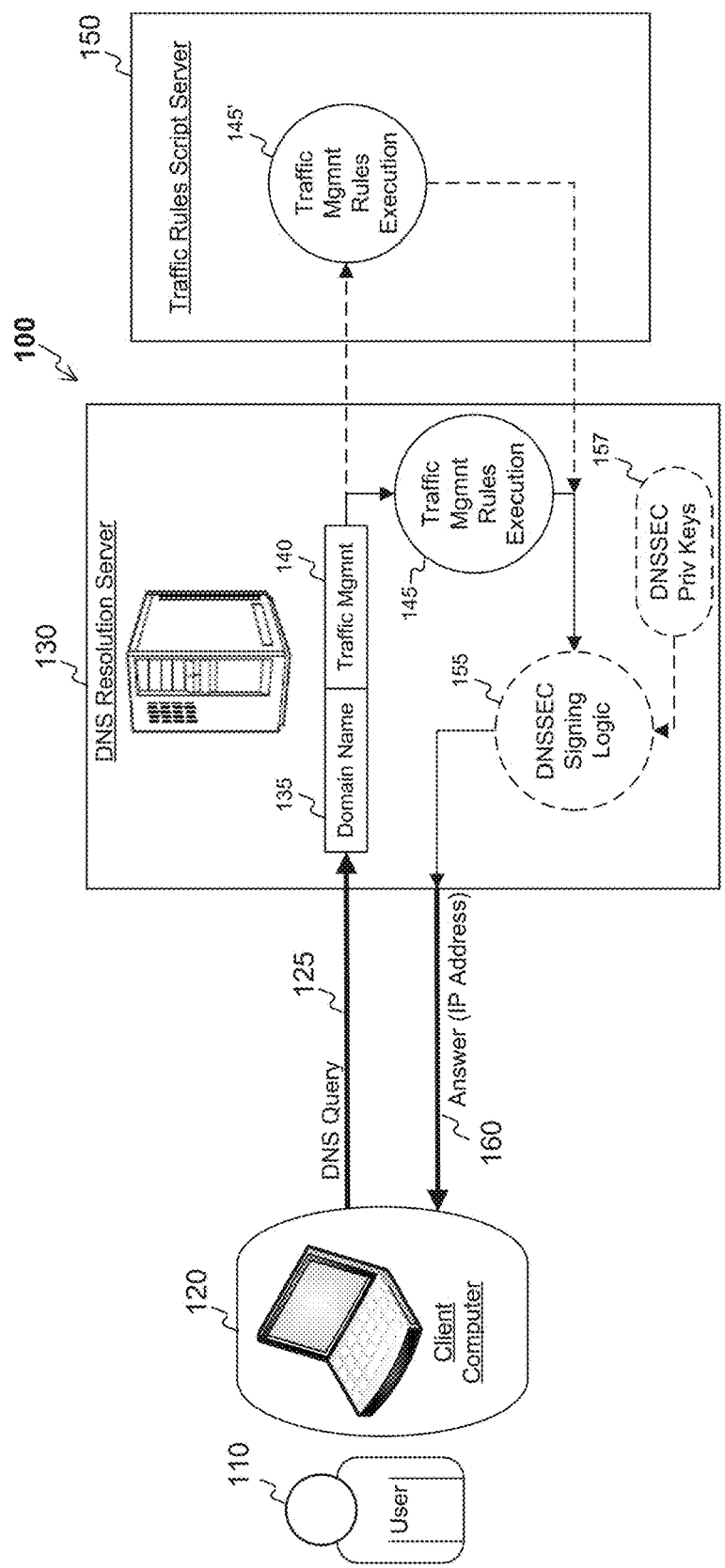
FIG. 1 illustrates a conventional system for processing DNS queries with DNS traffic management.

FIG. 1 illustrates a conventional system 100 for processing DNS queries with DNS traffic management. As shown, a user 110 may use a client computer 120, which may be running a browser (not shown), to submit a DNS query 125, (which specifies a domain name, e.g., example.com, and a resource record type "A" for IP address), to a DNS resolution server 130.

Upon receiving the DNS query 125, the DNS resolution server 130 attempts to look up or search for a corresponding answer (usually containing an IP address) 160 to return to the client computer 120 of the user 110. If there is only one corresponding answer (not shown), then the DNS resolution server 130 can find and return it using a table lookup indexed by the domain name specified in the DNS query 125. If, on the other hand, there are more than one corresponding answers, then the DNS resolution server 130 must implement DNS traffic management functionality to choose the proper answer. In the example shown, the DNS resolution server 130 may first perform a table lookup indexed by the domain name 135 and resource record type specified in the DNS query 125, and instead of finding a single answer, may find a traffic management indicator 140, which indicates that traffic management processing must be performed to find the correct answer 160 to return from among the more-than-one possible answers associated with the domain name and resource record type 135.

In order to provide traffic management functionality, some conventional DNS resolution servers 130 themselves perform the traffic management rules execution 145 to determine the proper answer 160 to return. This approach has the drawback of slowing down and tying up the processing resources of the DNS resolution server 130 as it executes traffic management code or scripts, retarding its ability to service new DNS queries that are continually arriving from a multitude of clients/requestors. Instead of performing the traffic management rules execution 145 themselves, some conventional DNS resolution servers 130 direct a traffic management rules script server 150 to perform the traffic management rules execution 145', as indicated by the dashed arrows to and from the traffic management rules script server 150. Although this offloads the traffic management processing from the DNS resolution server 130, it has the drawback of taking longer to return an answer 160 to the requesting client computer 120 because there is not only the delay of running the traffic management code or script in order to perform the traffic management rules execution 145', but there is also the added delay of the communications between the DNS resolution server 130 and the traffic management rules script server 150.

The traffic management rules execution 145/145' involves carrying out various traffic management techniques and algorithms to choose which one of the multiple answers to return. As noted, these techniques and algorithms are typically implemented as computer-executable code or a computer-executable script (or the like) that determines the state or value of one or more variable or factor (such as the geographic location of the requesting computer 120, the time of day, the value of a random number, etc.) and then chooses an answer to return based on the state or value of the one or more variable in relation to predetermined traffic management criteria. The traffic management choice of which answer to return for a domain name request or query 125 typically depends on factors or variables such as:

- The geographic location or the IP address of the requestor (e.g., choose the IP address of the geographically closest web server—East coast or West coast);
- The time of day (e.g., choose the IP address of server 1 from 6 am to 5:59 pm, and choose the IP address of server 2 from 6 pm to 5:59 am);
- The latency associated with transactions to the destination (e.g., choose the IP address of the server that provides faster network connections);
- The monetary cost of using the services of the destination IP address, which may vary based on time and geographic location (e.g., choose the IP address of the East coast server from 6 am to 5:59 pm, and choose the IP address of the West coast server from 6 pm to 5:59 am);
- Balancing the query volume load between different web servers (for 60% of DNS requests choose the IP address of the East coast server and for 40% choose the West coast address);
- Fail over (if the East Coast server is down, always choose the IP address of the West Coast server, and vice versa).

To illustrate DNS traffic management, consider the hypothetical case where the domain name "example.com" has three servers associated with it—two servers located on the East coast of the U.S. (East coast server number 1 having IP address 192.0.2.1, and East coast server number 2 having IP address 192.0.2.2) and one server located on the West coast (West coast server having IP address 203.0.113.1). Further consider that the registrant of "example.com" desires to manage the traffic to their website, (which is hosted by all three servers), such that:

1) users located East of the Mississippi river are directed to one of the East coast servers;
2) the East coast servers are load balanced such that East coast server number 1 receives 80 percent of the Eastern traffic and East coast server number 2 receives the remaining 20 percent;
3) users located West of the Mississippi river are directed to the West coast server;
4) If any of the three servers are down, the traffic that would otherwise go to it is directed to another server that is up; and
5) if all of the three servers are down, the traffic will be directed to East coast server number 2.

Referring now to FIG. 3A, these traffic management rules may be conventionally implemented by a script 300 that is executed each time a DNS query 125 for the domain name "example.com" is received by the DNS resolution server 130. As noted above, the script 300 may be executed by the DNS resolution server 130 itself, or by the traffic management rules script server 150. But either way, the script 300 that determines which one of the multiple answers to return is run or executed dynamically for each domain name request in a query 125, and execution of the script 300 can significantly delay the response to the requesting computer 120. Moreover, the more complex the traffic management rules are, the longer and more complex the script 300 will be, and the longer it will take to execute. FIG. 3A is described in further detail below.

Referring again to FIG. 1, the DNS resolution server 130 may also optionally implement domain name security extensions (DNSSEC), as represented by the dashed-line shapes. DNSSEC works by digitally signing the records which constitute the answer 160 (e.g. the IP address of the server) using public-key cryptography, and thus the DNS resolution server 130 may execute DNSSEC signing logic 155, using DNSSEC private keys 157, either to create the digital signature of the answer 160 returned from its internal traffic management rules execution 145 or to create the digital signature of the answer 160 returned from the traffic management rules execution 145' executed by the external traffic management rules script server 150. DNSSEC digital signing logic 155 is processing intensive and has the negative effect of slowing down and tying up the processing resources of the DNS resolution server 130; again retarding its ability to service new DNS queries that are continually arriving from a multitude of clients/requestors.

After identifying or choosing the correct answer 160 for a queried domain name 135 according to its traffic management criteria, and after optionally digitally signing the answer 160 using DNSSEC private keys 157, the DNS resolution server 130 returns the answer 160 to the requesting client computer 120, which uses it to connect to a server (or other network resource) associated with the domain name 135.

One of ordinary skill will recognize that the components and implementation details of system 100 are simplified examples presented for conciseness and clarity of explanation. Other components, implementation details, and variations may be used. For example, with respect to FIG. 1 and all the embodiments described herein, the information returned by the DNS resolution server 130 is described simply as an answer 160 for simplicity and clarity of explanation, but one of ordinary skill will recognize that the DNS resolution server 130 actually implements all conventional DNS standards and requirements as are well known in the art, including processing and returning a DNS resource record set relating to the DNS request 125. For example, in accordance with DNS standards, the DNS resolution server 130 may return as an answer 160 to the requesting client computer 120 an A record or an AAAA record containing the IP address, and/or an RRSIG record with the corresponding DNSSEC signature.

Figure 2:
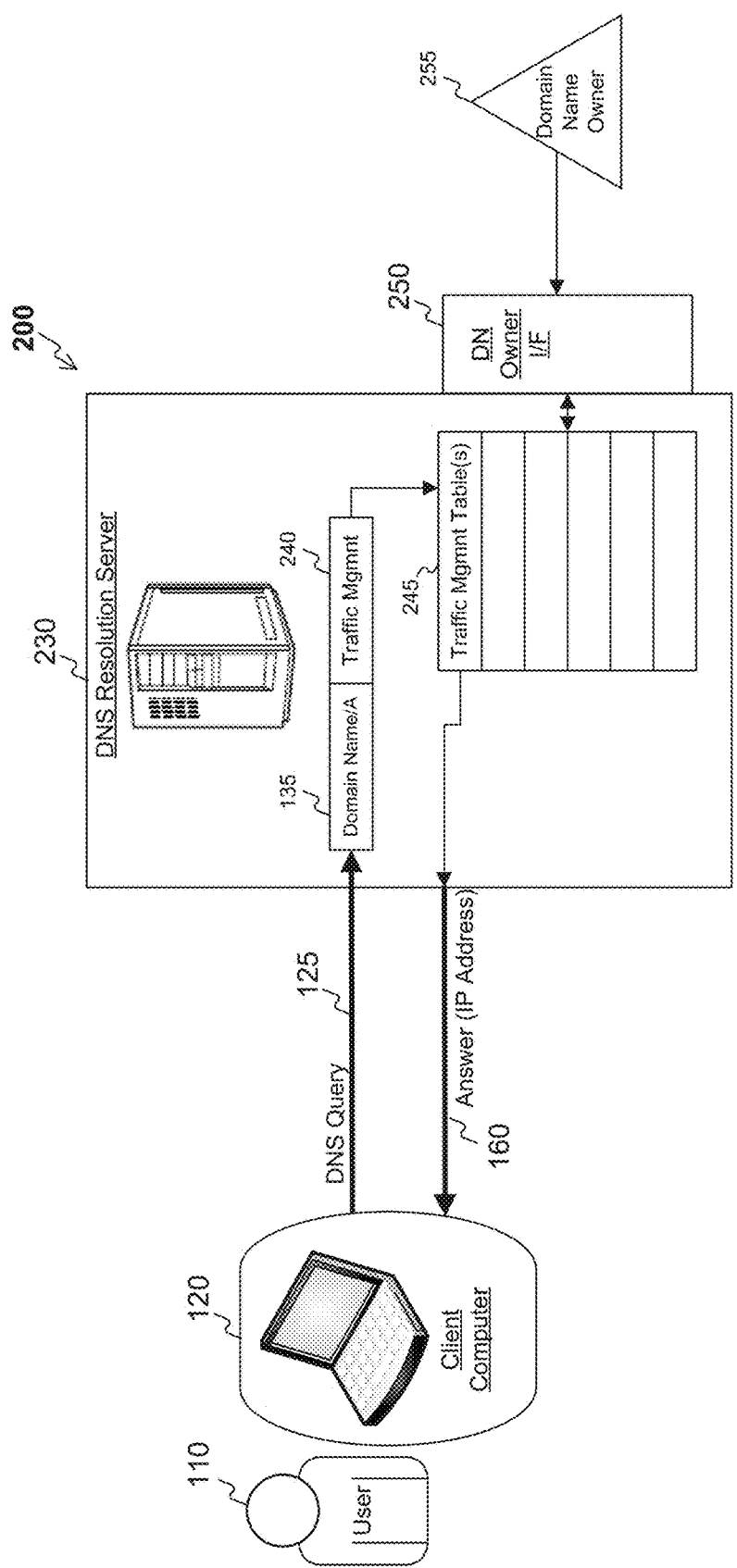
FIG. 2 illustrates an exemplary system for processing DNS queries with DNS traffic management, consistent with the principles of the invention.

FIG. 2 illustrates an exemplary system 200 for processing DNS queries with improved DNS traffic management, consistent with the principles of the invention. Like FIG. 1, a user 110 may use a client computer 120, which may be running a browser (not shown) to submit a DNS query 125, (which specifies a domain name and resource record type 135, e.g., "A records" for example.com), to a DNS resolution server 230.

Upon receiving the DNS query 125, the DNS resolution server 230 attempts to look up or search for a corresponding IP address/answer 160 to return to the client computer 120 of the user 110. In various embodiments, the domain name and resource record type 135 contained in the query 125 are used as a search key for this look up. If there is only one corresponding answer (not shown), then the DNS resolution server 230 can find and return it using a table look up indexed by the domain name and resource record type 135 specified in the DNS query 125. If, on the other hand, there are more than one corresponding answers to choose from, then the DNS resolution server 230 may find an indicator 240, such as a link, pointer or lookup key, directing that traffic management must be performed to find the correct answer 160 to return from among the more-than-one possible answers associated with the domain name 135 and resource record type.

In the embodiment shown, the DNS resolution server 230 does not execute traffic management code/scripts and does not offload the traffic management code/script computations to another server, but instead performs additional table lookup(s) or search(es) to find the correct answer 160 to return from among the more-than-one possible answers. The tables are designed to return the proper answer according to the traffic management rules associated with the domain name 135 and resource record type. Table lookups are relatively fast, require few processing resources and little processing time. Accordingly, the DNS resolution server 230 does not suffer the drawbacks of the DNS resolution server 130 shown in FIG. 1. And in addition to faster DNS query responses, DNS resolution server 230 is also less vulnerable to denial-of-service (DOS) attacks than DNS resolution server 130, in part because it responds faster, and with less processor usage, to DNS queries.

In the embodiment shown in FIG. 2, the traffic management rules for resolving a given domain name 135 and resource record type are expressed as a series of rows in a traffic management table(s) 245—ensuring there is a row to cover every possible scenario. Similarly, the traffic management rules for resolving a given zone (e.g., all the domain names handled by the DNS resolution server 230) are expressed in the traffic management table(s) 245, so that all domain name queries are processed the same way.

Thus, upon receiving the domain name and resource record type 135 in the DNS query 125, the DNS resolution server 230 may find an indicator 240, such as a link, search key, or pointer or the like, directed to a row(s) in the traffic management table(s) 245 that represents traffic management functionality, where that row, in turn, may include the desired answer 160 or another link, pointer, index, search key etc. that enables the lookup of another row in the traffic management table(s) 245, which implements additional traffic management functionality. As noted, the traffic management table(s) 245 is designed to ensure that the lookup or search process is directed through a set or series of rows that cover every possible traffic management scenario and eventually leads to an answer 160 or other definitive response to the requesting client computer 120, in accordance with DNS standards.

With this approach, no script or code execution is needed to control the branching and flow of the traffic management rules. Nor is there any of the processing overhead associated with setting up a code execution environment or communicating with a separate server. In various embodiments, the only traffic-management-related computation done by the DNS resolution server 230 is to fetch and/or determine the current value of any variables that are used as criteria for traffic management functionality decisions, which variables may be used or represented as search indexes for table lookups in some embodiments. Examples of such variables include the geographic location of the requestor (e.g., of the client computer 120), the value of a random number used for weighted load balancing decisions, the operational (up) or non-operational (down) status of a web site server, etc. In resolving a domain name and resource record type for which traffic management rules or criteria apply, the DNS resolution server 230 is able to search for and find or identify the appropriate answer by looking up the appropriate row(s) in the traffic management table(s) 245 in turn. Various embodiments of this approach may have no practical limits on supporting the complexity of traffic management rules for each domain name owner 255, as more complex traffic management rules merely result on more rows in each table to cover every possible look up scenario.

In the embodiment shown, the DNS resolution server 230 includes a domain name owner interface 250 that allows a domain name owner 255 to configure the traffic management rules that will apply to their domain name and that are represented in the traffic management table(s) 245. In some embodiments, the domain name owner 255 may provide or input traffic management rules in the form of a script or other executable or interpretable code or pseudocode, (e.g., as shown in FIG. 3A), and the domain name owner interface 250 may translate the script or code into corresponding entries in the traffic management table(s) 245. In other embodiments, domain name owner interface 250 may provide a graphical user interface that allows the domain name owner 255 to enter and specify their servers (or other resources) and their requirements for traffic management in a more natural language format, similar to that shown in paragraph 0024 above, which the interface 250 translates into corresponding entries in the traffic management table(s) 245.

In some embodiments where the DNS resolution server 230 implements DNSSEC, the traffic management table(s) 245 may include the digital signature associated with each answer 160 returned from the traffic management table lookup or search. In such embodiments, because there are a finite number of answers that could be returned (e.g., three distinct IP addresses in the case of the example presented with respect to FIG. 3A), the DNSSEC digital signature for each may be precomputed at table setup time, and then stored and looked up as needed for each DNS query 125 in the same manner as each answer 160 is looked up. Because the DNSSEC digital signatures may be pre-computed offline on another computing system, there is no need to distribute private DNSSEC keys 157 to a DNS resolution server 230 to generate a valid digital signature and chain of trust on a per-request basis. With respect to DNSSEC processing, this application is somewhat related to a co-pending application entitled "Systems and Methods for Pre-Signing of DNSSEC Enabled Zones into Record Sets" by Ramakant Pandrangi and David Blacka, having U.S. application Ser. No. 14/092,528; and a filing date of Nov. 27, 2013; and which is hereby incorporated by reference in its entirety.

One of ordinary skill will recognize that the components and implementation details of system 200 are simplified examples presented for conciseness and clarity of explanation. Other components, implementation details, and variations may be used. For example, the domain name owner interface 250 may be moved to a different computing system that is not a DNS resolution server. In such embodiments, the traffic management table(s) 245 for a zone may be configured offline with the input from various domain name owners having domains in the zone, and then the traffic management table(s) 245 may be deployed to each operational instance of a DNS resolution server 230 at the resolution site. For another example, as one of ordinary skill will recognize, the traffic management rules may be contained in a fast data structure that provides performance advantages over executing code or a script, other than the lookup table(s) described in the exemplary embodiments. For still another example, instead of a dedicated DNS resolution server 230, the functionality described throughout this application may be implemented by a cloud.

FIG. 3A is an example of a conventional traffic management script 300 that implements traffic management rules. As noted above, the script 300 may be executed by a conventional DNS resolution server 130 or a conventional traffic rules script server 150 each time the domain name associated with the script 300 is queried.

Also as noted above, the script 300 implements the traffic management rules for the following example of traffic management requirements: the domain name "example-.com" has three servers associated with it—two servers located on the East coast of the U.S. (East coast server number 1 having IP address 192.0.2.1, and East coast server number 2 having IP address 192.0.2.2) and one server located on the West coast (West coast server having IP address 203.0.113.1). Further the registrant of "example-.com" (e.g., the domain name owner 255 for "example-.com") desires to manage the traffic to their website such that:

1) users located East of the Mississippi river are directed to one of the East coast servers (see the code at the label "Start:");
2) the East coast servers are load balanced such that East coast server number 1 receives 80 percent of the Eastern traffic and East coast server number 2 receives the remaining 20 percent (see the code at the label "Load Balance:");
3) users located West of the Mississippi river are directed to the West coast server (see the code at the ELSE at the label "Start:");
4) If any of the three servers are down, the traffic that would otherwise go to it is directed to another server that is up (see the code at the labels "Fail_Over_1:" "Fail_Over_2:" and "Fail_Over_212:"); and
5) if all of the three servers are down, the traffic will be directed to East coast server number 2.

Figure 3B:
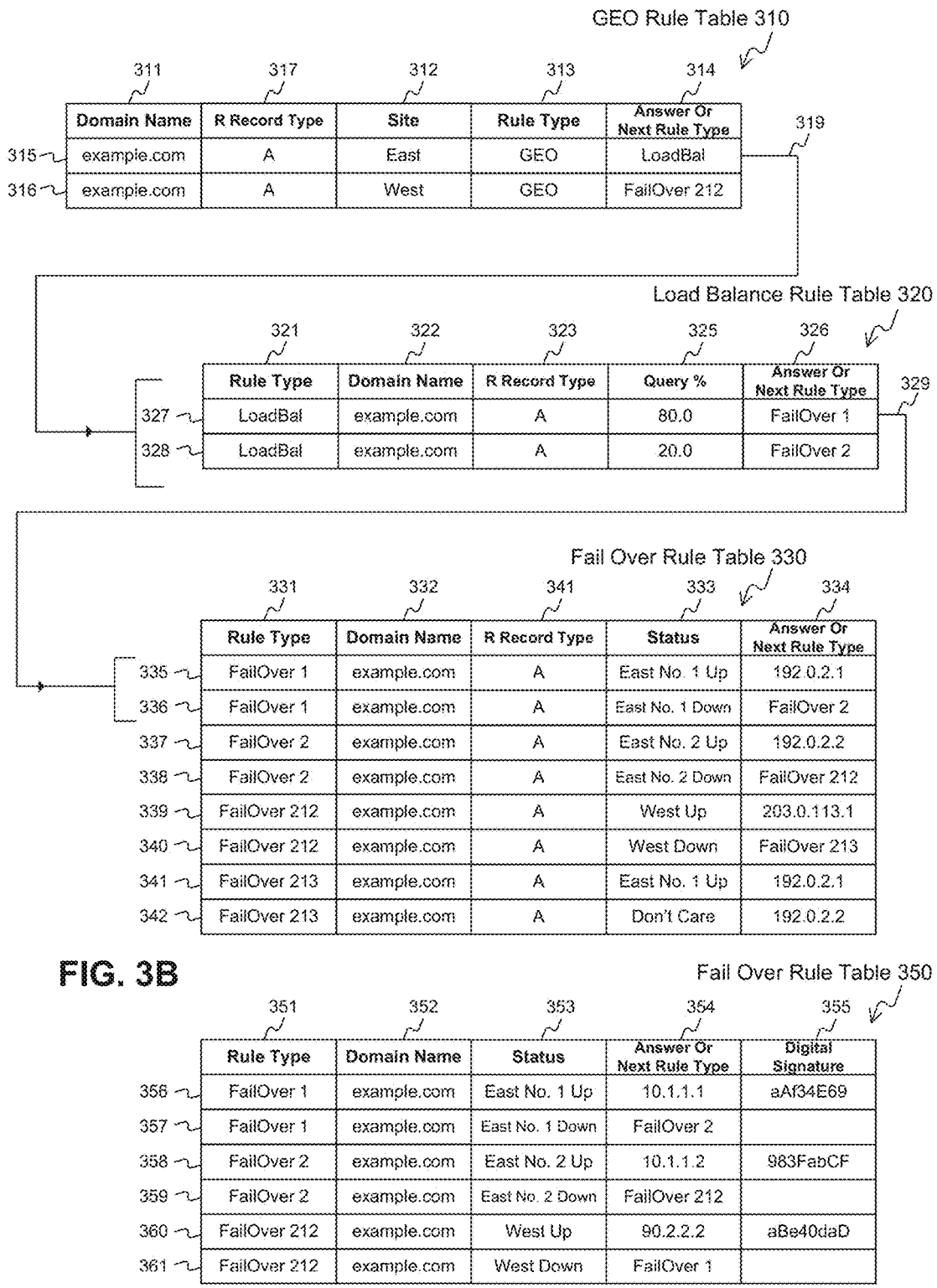
FIG. 3B is an example of a set of traffic management tables, consistent with the principles of the invention.

FIG. 3B is an example of a set of traffic management tables, consistent with the principles of the invention, which are related to the script 300 of FIG. 3A. In various embodiments, the traffic management tables of FIG. 3B may correspond to the traffic management table(s) 245 shown in FIG. 2.

As shown, FIG. 3B provides four examples of traffic management tables for the domain name "example.com": a GEO rule table 310, a load balance rule table 320, and two examples of fail over rule tables 330 and 340, where fail over rule table 340 is the same as fail over rule table 330, but with an additional column 355 that provides additional information (digital signature information in this example) along with the final IP address.

The rules tables of FIG. 3B represent the traffic management script 300 of FIG. 3A as lookup tables. For example, in the embodiment shown in FIG. 3B, the GEO rule table 310 corresponds to the section of script code labeled "START" in FIG. 3A.

In a usage example with reference to FIGS. 2 and 3B, upon receiving a DNS query 125 specifying "example.com" as the domain name 135 and "A" as the resource record type, the DNS resolution server may perform an initial table lookup or search of domain name 135 "example.com" and resource record type "A" and discover the traffic management indicator 240, which indicates that additional traffic-management-rule lookup(s) or search(es) are required (as opposed to discovering an answer as would be the case for a domain name having a single answer (e.g., a single IP address) and/or no traffic management functionality).

Triggered by the traffic management indicator 240, the DNS resolution server 230 next finds a table indexed by the domain name "example.com" and resource record type "A" in the first and second columns—in the example shown in FIG. 3B, the DNS resolution server finds the GEO rule table 310, which contains "example.com" in both rows 315 and 316 of the first column 311, resource record type "A" in the second column 317, and the rule type "GEO" in the rule type column 313. Triggered by the rule type of "GEO" in column 313, the DNS resolution server 230 then determines whether the requesting client computer 120 is located in the East (column 312, row 315) or the West (column 312, row 316).

In various embodiments, the DNS resolution server 230 may make this determination by extracting the IP address of the requesting client computer 120 from the DNS query 125 and matching that IP address with its geographic location via a geographic lookup table, via a web service that returns a geographic location when given an IP address, or via some other means as are commonly known in the art.

If the requesting client computer 120 is located in the East, then the DNS resolution server 230 matches with or looks up row 315 (because column 312, row 315 contains "East") to try to find an answer in row 315 of the Answer Or Next Rule Type column 314. If, on the other hand, the requesting client computer 120 is located in the West, then the DNS resolution server 230 matches with or looks up row 316 (because column 312, row 316 contains "West") to try to find an answer in row 316 of the Answer Or Next Rule Type column 314.

In this example, which represents the script 300 shown in FIG. 3A, neither row 315 nor row 316 of column 314 contains an answer because there are other traffic management rules to resolve in addition to GEO. Here, if the requesting client computer 120 is located in the East, then a load balancing rule must be carried out, as corresponds to section of script code labeled "LOAD_BALANCE" in FIG. 3A. Or, if the requesting client computer 120 is located in the West, then a fail over rule must be carried out, as corresponds to section of script code labeled "FAIL_OVER_212" in FIG. 3A.

Assuming for this example that the requesting client computer 120 is located in the East, the DNS resolution server 230 next looks up or searches for a rules table row that matches rule type="LoadBal" (from column 314, row 315 of the GEO rule table 310) and that matches domain name="example.com" and resource record type="A" (from the DNS query 125), which leads to the load balance rules table 320, based on columns 321, 322, and 323, respectively. This is represented by an arrow 319 in FIG. 3B.

Triggered by the rule type of "LoadBal" in column 321, the DNS resolution server 230 then generates a random number from 1-100 to apply against the "Query %" (column 325). If the number is from 1-80, then it matches the 80% row (column 325, row 327) and if it is from 81-100 then it matches the 20% row (column 325, row 328).

If load balance table row 327 is matched or looked up, then the DNS resolution server 230 tries to find an answer in the Answer Or Next Rule Type column 326 of row 327. If, on the other hand, load balance table row 328 is matched or looked up, then the DNS resolution server 230 tries to find an answer in the Answer Or Next Rule Type column 326 of row 328.

In this example, which represents the script 300 shown in FIG. 3A, neither row 327 nor row 328 of column 326 contains an answer because there are other traffic management rules to resolve in addition to load balancing. Here, if the query randomly is placed into the 80% category, then a fail over rule for East server 1 must be carried out, as corresponds to the section of script code labeled "FAIL_OVER_1" in FIG. 3A. Or, if the query randomly is placed into the other 20% category, then a fail over rule for East server 2 must be carried out, as corresponds to section of script code labeled "FAIL_OVER_2" in FIG. 3A.

Assuming for this example that the random number was less than 80, causing a search match with row 327 of the load balance rules table 320, the DNS resolution server 230 next searches for a rules table row that matches rules type="FailOver 1" (from column 326, row 327 of the load balance rule table 320) and that matches domain name="example.com" and resource record type="A" (from the DNS query 125), which leads to the fail over rule table 330, based on matching columns 331 332, and 341 respectively. This is represented by an arrow 329 in FIG. 3B.

Triggered by the rule type of "FailOver 1" in column 331, rows 335 and 336, the DNS resolution server 230 then ascertains the status of the East No. 1 server. If the East No. 1 server is "Up," then the lookup matches the "East No. 1 Up" row (column 333, row 335) or if the East No. 1 server is "Down," then the lookup matches the "East No. 1 Down" row (column 333, row 336).

Assuming for this example that the East No. 1 server is "Up," causing a look up match or search match with row 335 of the fail over rules table 320, then DNS resolution server 230 considers the Answer or Next Rule Type column 334 to find out what to do next. In this case, matching row 335 of column 334 contains an answer of "192.0.2.1," which is the IP address of the East coast server no. 1, and because this is indeed an IP address and not another rule indicator or pointer, the DNS resolution server 230 returns the IP address "192.0.2.1" as the answer 160 to the DNS query 125.

As with the example just presented that ends up returning the IP address "192.0.2.1" as the answer 160 to the DNS query 125, the DNS resolution server 230 may similarly navigate other paths through tables 310, 320, and 330 to arrive at either of the other two possible IP addresses ("192.0.2.2" at column 334, rows 337, 342, or "203.0.113.1" at column 334, row 339) in accordance with the variables and the traffic management rules and criteria shown in FIG. 3A.

As noted above, these examples are simplified to very clearly illustrate various embodiments consistent with the invention. In working implementations and embodiments in the DNS context, the traffic management tables, and the information returned by the DNS resolution server 230 in response to the DNS query 125, is fully DNS compliant. For example, instead of an IP address as shown in the example of FIG. 3B, the IP Address or Next Rule Type column 334 may contain a DNS resource record corresponding to the IP address (e.g., an A resource record or an AAAA resource record) or a pointer thereto, such that the DNS resolution server 230 returns the resource record per standard DNS requirements and procedures.

In some embodiments, additional tables, or a table that includes additional information, may be used to return additional, non-IP-address information in response to the DNS query 125, such as DNSSEC information that goes along with an IP address. In one such embodiment, a table such as fail over rule table 350 may be used in place of fail over rule table 330. As shown, the fail over rule table 350 includes in column 355 the DNSSEC digital signature that corresponds to each answer in column 354, and the DNS resolution server 230 may look up and return to the requestor the additional information in column 355 along with the answer in column 354. Note that for conciseness and clarity, the "R Record Type" column and the "FailOver 213" rows of the fail over rule table 350 have been left off FIG. 3B.

One of ordinary skill will recognize that the components and implementation details of the lookup tables in FIG. 3B are simplified examples presented for conciseness and clarity of explanation. Other components, implementation details, and variations may be used. For example, the answers of columns 334 or 354 may be contained in a separate table instead of being tied to the fail over rules tables 330 and 350, which may make generation, modification, and rearrangement of the rules tables 310, 320, 330, and 340 easier as the traffic management requirements of a given domain name 135 and domain name owner 255 change.

FIG. 4 is another example of a set of traffic management tables, consistent with the principles of the invention. In various embodiments, the traffic management tables of FIG. 4 may correspond to the traffic management table(s) 245 shown in FIG. 2.

In the exemplary embodiment of FIG. 4 there are three examples of traffic management tables for the domain name "example.com": a load balance rule table 410, a resource record table 420, and a resource record signature table 430.

To demonstrate an example of a use case for these tables with reference to FIGS. 2 and 4, consider a case where the domain name owner 255 for the domain name "example.com" has two different data centers: an East coast data center comprising two servers with the IP addresses "192.0.2.1" and "192.0.2.2" and a West coast data center comprising two servers with the IP addresses "203.0.113.2" and "203.0.113.3." Further, domain name owner 255 wants to load balance their web site traffic across the two data centers with 60% of their DNS requests handled by the East coast data center and 40% handled by their West coast data center.

In the embodiment shown, the traffic management rules and associated logic for this load balancing requirement are expressed as rows within the load balance rule table 410. The load balance rules table 410 includes a domain name column 411 (in this case containing only the domain name "example.com" in both rows), a site column 412 containing the label for each of the data centers (East in row 416, and West in row 417), a rule type column 413 containing the traffic management rule label (in this example, only the "load balance" rule is illustrated), a Query % column 414 specifying the percentage of DNS queries 125 to send to each data center, and a variant ID column 415 specifying a search key or link used to look up another table/row in the traffic management rules tables.

In operation, upon receiving a DNS query 125 specifying "example.com" as the domain name and "A" as the resource record type 135, the DNS resolution server may perform an initial lookup of the domain name and resource record type 135 "example.com" and "A" to search for and find a table or rows indexed by the domain name "example.com" in the first column 411 and resource record type "A" in the second column 418—in the example shown in FIG. 4, the DNS resolution server finds the load balance rule table 410, which contains "example.com" and "A" in both rows 416 and 417 of the first column 411 and second column 418 and the rule type "Load Balance" in the rule type column 413.

Triggered by the rule type of "Load Balance" in column 413, the DNS resolution server 230 then generates a random number from 1-100 to apply against the "Query %" column 414. If the random number is from 1-60, then the lookup matches the 60% row (column 414, row 416) and if it is from 61-100 then it matches the 40% row (column 414, row 417).

If load balance rules table row 416 is matched or looked up, then the DNS resolution server 230 tries to look up a table row matching Variant ID=0 (column 415, row 416). If, on the other hand, load balance rules table row 417 is matched or looked up, then the DNS resolution server 230 tries to find or look up a table row matching Variant ID=212 (column 415, row 417).

Assuming for this example that the random number was larger than 60, causing a look up match or search match with row 417 of the load balance rules table 410, the DNS resolution server 230 next looks up a rules table row that matches Variant ID="212" (from row 417 of the load balance rule table 410) and that matches Domain Name="example.com" and resource record type "A" (from the DNS query 125 and from columns 411 and 418, row 417 of the load balance rule table 410), which leads to rows 427 and 428 of the resource record table 420, based on matching those rows of columns 421, 422, and 429. This is represented by an arrow 419 in FIG. 4.

The resource record table 420 defines the one or more answers associated with each 'Variant ID' for the DNS zone being queried. Because this is a resource record table (as opposed to another rules table that would trigger further search processing), the DNS resolution server 230 returns as IP address 160 the two IP addresses of "203.0.113.2" and "203.0.113.3" that are listed in the two matching rows 427 and 428, column 423. As is known in the DNS art, a DNS query 125 may be answered with address resource records indicating more than one IP addresses, and there are various mechanisms for the browser on the client computer 120 to choose which one to use.

In some embodiments that optionally implement DNSSEC, the DNS resolution server 230 may also look up RRSIG records to return with the answer. As shown in the example of FIG. 4, each of the domain name to IP address lookups defined in the load balance rules table 410 and the resource record table 420 are digitally signed according to DNSSEC standards beforehand to create corresponding RRSIG records, and the RRSIG records are maintained in the separate RRSIG table 430. Continuing the above example, the DNS resolution server 230 would look up row 435 of RRSIG table 430 based on the match of the Variant ID "212" in column 431, and return the appropriate RRSIG record and/or Digest of IP Address Record Set from row 435, columns 432 and 433. As previously noted, precomputing and storing the DNSSEC digital signatures in the rule tables obviates the need to distribute private DNSSEC keys to the DNS resolution server 230. In resolving a domain name for which traffic management logic applies, the DNS resolution server 230 is able to search for and find the appropriate IP address and verify a valid DNSSEC signature and chain of trust by looking up the appropriate rows in the above tables in turn.

Figure 5:
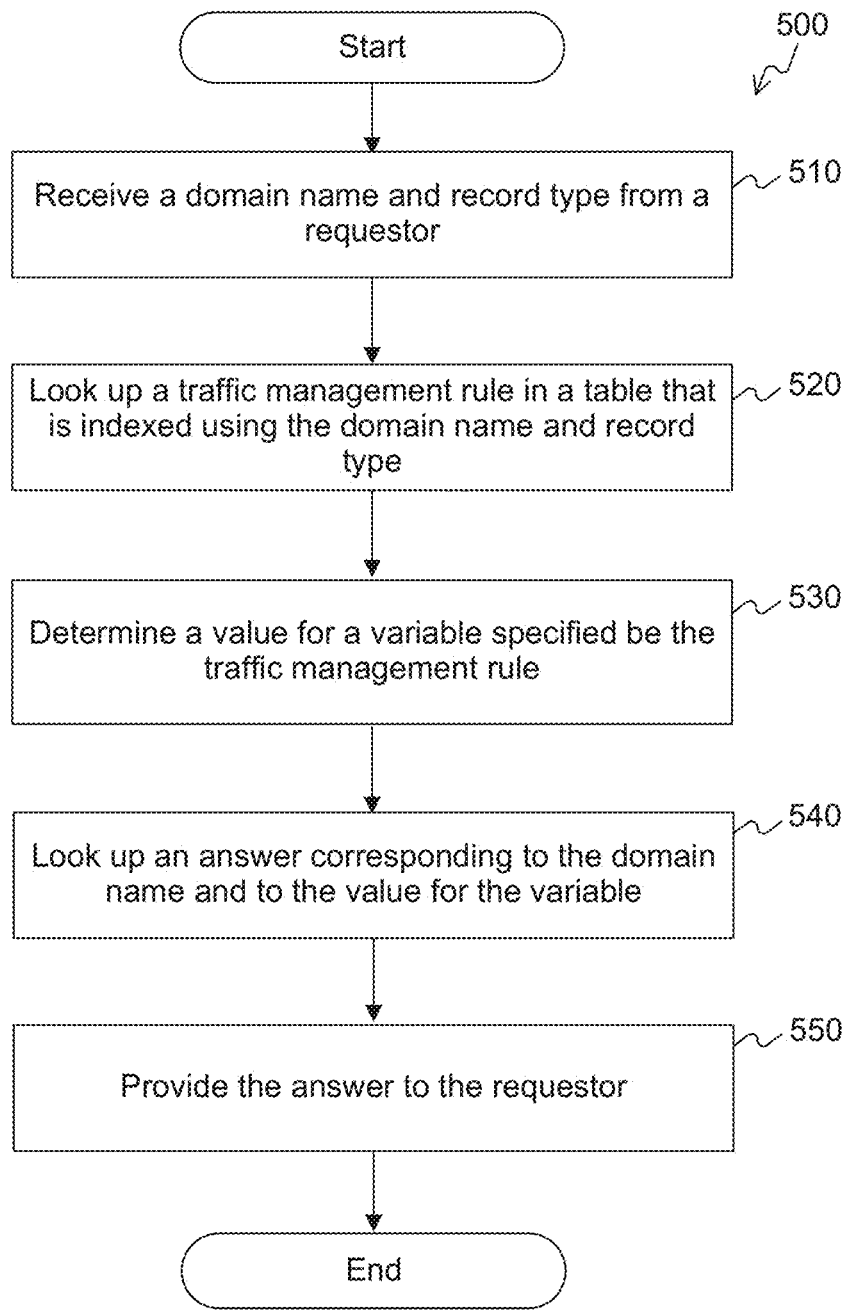
FIG. 5 is a flow chart of an exemplary process for high performance implementation of DNS traffic management rules, consistent with embodiments of the invention.

FIG. 5 is a flow chart of an exemplary process 500 for high performance implementation of DNS traffic management rules, consistent with embodiments of the invention. In various embodiments, some or all of process 500 may be performed by software executing on a general purpose computing system (which may include one or more processors or one or more computing subsystems), by a hardware-only system, or by a system that is a hybrid of the two. In various embodiments, process 500 may be implemented by a processor or purpose-designed hardware that is included in the DNS resolution server 230 of FIG. 2.

In the embodiment shown in FIG. 5, process 500 begins with receiving a domain name and resource record type from a requestor (stage 510). In various embodiments, the domain name and resource record type may be part of a DNS query, such as the DNS query 125 from the browser of the client computer 120, as described with respect to FIG. 2.

At stage 520, process 500 looks up or searches for a traffic management rule in a table that is indexed using the domain name and resource record type. In other words, this embodiment uses the domain name and resource record type as a composite search index to find the traffic management rule. In various embodiments, there may be more than one traffic management rule in the table or in multiple tables. In various embodiments, the table may be a traffic management table 245 as described with respect to FIG. 2 and/or a rule table 310, 320, 330, or 350 as described with respect to FIG. 3B and/or a rule table 410, 420, or 430 as described with respect to FIG. 4.

Process 500 next determines a value for a variable specified by the traffic management rule (stage 530). In some embodiments, the variable may be a geographical location or the IP address of the requestor, for example, similar to that described above with respect to the GEO rule table 310 of FIG. 3B. In some embodiments, the variable may be a random number, or other load balancing variable, that is used to direct queries to specific servers associated with the domain name according to specified weighted load balancing criteria (e.g., percentages), for example, similar to that described above with respect to the load balance rule table 320 of FIG. 3B, or similar to that described above with respect to the load balance rule table 410 of FIG. 4. In some embodiments, the variable may be an operational (e.g., "up') or nonoperational (e.g., "down") status of a server associated with the domain name, for example, similar to that described above with respect to the fail over rule tables 330 and 350 of FIG. 3B. In still other embodiments, the variable may be the time of day, the latency associated with transactions to specific servers associated with the domain name, the monetary cost of using the services of specific IP addresses associated with the domain name, or the current loading or current available capacity of a server associated with the domain name, or any other factor that affects the selection, according to traffic management criteria, from among more than one choice of an answer to return in response to a DNS query. In yet other embodiments, there may be no need to determine a variable value in order to satisfy a traffic management rule, and this stage may be skipped.

In some embodiments, process 500 may determine the value for a variable specified by the traffic management rule by accessing a data store or database that holds information reflecting the current or recent status of the servers or other resources associated with a domain name, where the IP addresses of those servers or other resources are stored in traffic management table(s) (e.g. 245) in association with the traffic management rule. In some embodiments, the data store or database may be updated periodically by the servers or other resources associated with a domain name. In other embodiments, a DNS resolution server or an associated auxiliary server may periodically actively obtain the variable information from the servers or other resources associated with a domain name.

At stage 540, process 500 looks up or searches for an answer corresponding to the domain name, resource record type, and value for the variable determined in stage 530. In various embodiments, stage 540 may be implemented by using the domain name, resource record type, and variable value as keys or indexes to identify one or more rows in a traffic management rules table(s) (e.g., the traffic management table(s) 245 of FIG. 2) that contain a matching domain name, resource record type, and value for the variable, wherein the one or more rows includes a column containing the answer or a reference to the answer. Various embodiments may implement this stage in a manner similar to that described above with respect to the load balance rule table 410 and the resource record table 420 of FIG. 4, or in a manner similar to that described above with respect to the fail over rule tables 330 and 350 of FIG. 3B.

At stage 550, process 500 provides the answer to the requestor from whom the domain name and resource record type was received in stage 510, such as, for example, the client computer 120 that sent the DNS query 125 of FIG. 2.

In various embodiments, as noted above, the answer may be in the form of, or included with, a DNS resource record, such as an A resource record or an AAAA resource record.

One of ordinary skill will recognize that exemplary process 500 is presented for conciseness and clarity of explanation, and that stages may be added to, deleted from, reordered, or modified within process 500 without departing from the principles of the invention. For example, a stage may be added before stage 510 to express or convert DNS traffic rules, requirements, code, or script language as rows in the table, such that there is a row to cover all of the possible traffic management outcomes. For another example, stage 540 may be modified to look up either an answer, if that is contained in a table row, or to look up a succeeding traffic management rule(s) and then iterate stages 530 and 540 to evaluate the succeeding traffic management rule(s) until an answer is found. For yet another example, stages 540 and 550 may be modified to look up and provide more than one IP addresses that are the output of traffic management rules, for example, in a manner similar to that described above with respect to load balance rule table 410 and the resource record table 420 of FIG. 4. For still another example, stages 540 and 550 may be modified to look up and provide other information in addition to the answer corresponding to the domain name, such as, for example, a DNSSEC digital signature for the answer in a manner similar to that described above with respect to fail over rule table 350 of FIG. 3B and/or RRSIG table 430 of FIG. 4. Other variations are possible.

Figure 6:
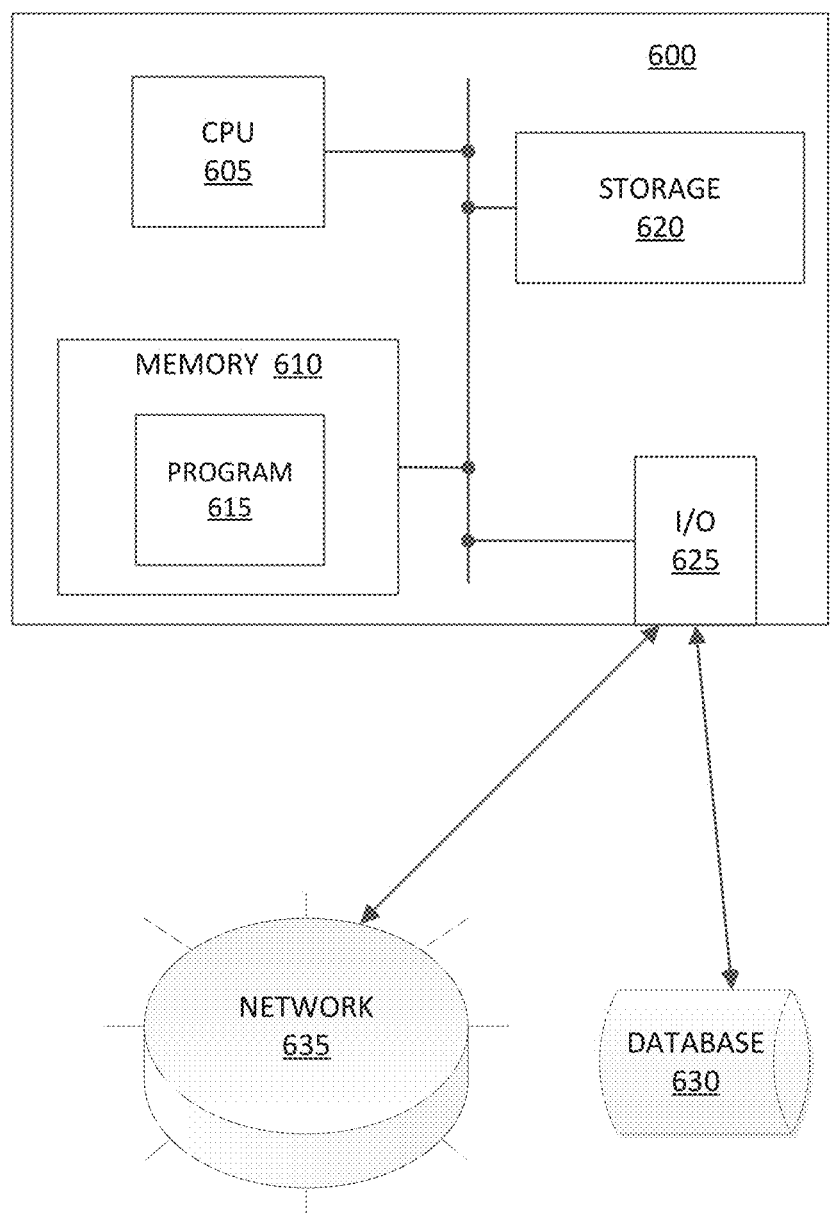
FIG. 6 is a block diagram of an exemplary computing system useful for implementing systems and methods consistent with embodiments of the invention.

FIG. 6 is a block diagram of an exemplary computing system or data processing system 600 that may be used to implement embodiments consistent with the invention. Other components and/or arrangements may also be used. In some embodiments, computing system 600 may be used to implement, either partially or fully, various components of FIG. 2, such as the DNS resolution server 230 and/or the domain name owner interface 250. In some embodiments, computing system 600 may be used to implement, either partially or fully, process 500 of FIG. 5, among other things.

Computing system 600 includes a number of components, such as a central processing unit (CPU) 605, a memory 610, an input/output (I/O) device(s) 625, and a nonvolatile storage device 620. System 600 can be implemented in various ways. For example, an implementation as an integrated platform (such as a server, workstation, personal computer, laptop, smart phone, etc.) may comprise CPU 605, memory 610, nonvolatile storage 620, and I/O devices 625. In such a configuration, components 605, 610, 620, and 625 may connect and communicate through a local data bus and may access a database 630 (implemented, for example, as a separate database system) via an external I/O connection. I/O component(s) 625 may connect to external devices through a direct communication link (e.g., a hardwired or local wifi connection), through a network, such as a local area network (LAN) or a wide area network (WAN), and/or through other suitable connections. System 600 may be standalone or it may be a subsystem of a larger system.

CPU 605 may be one or more known processors or processing devices, such as a microprocessor from the Core™ 2 family manufactured by the Intel™ Corporation of Santa Clara, Calif. or a microprocessor from the Athlon™ family manufactured by the AMD™ Corporation of Sunnyvale, Calif. Memory 610 may be one or more fast storage devices configured to store instructions and information used by CPU 605 to perform certain operations, functions, methods, and processes related to embodiments of the present invention. Storage 620 may be a volatile or nonvolatile, magnetic, semiconductor, tape, optical, or other type of storage device or computer-readable medium, including devices such as CDs and DVDs, meant for long-term storage.

In the illustrated embodiment, memory 610 contains one or more programs or subprograms 615 loaded from storage 620 or from a remote system (not shown) that, when executed by CPU 605, perform various operations, procedures, processes, or methods consistent with the present invention. Alternatively, CPU 605 may execute one or more programs located remotely from system 600. For example, system 600 may access one or more remote programs via network 635 that, when executed, perform functions and processes related to embodiments of the present invention.

In one embodiment, memory 610 may include a program(s) 615 for processing DNS queries via table look-ups that represent DNS traffic management rules and criteria, and/or a program 615 that implements at least a portion of process 500 of FIG. 5. In some embodiments, memory 610 may also include other programs, applications, or data that implement other methods and processes that provide ancillary functionality to the invention. For example, memory 610 may include programs or data used to access, receive, transmit, gather, organize, store, and/or generate invention-related data, such as variable status data, traffic management rule data, IP address data, geographical location data, time of day data, server latency data, server cost data, server status and load data, etc.

Memory 610 may be also be configured with other programs (not shown) unrelated to the invention and/or an operating system (not shown) that performs several functions well known in the art when executed by CPU 605. By way of example, the operating system may be Microsoft Windows™, Unix™, Linux™, an Apple Computers™ operating system, Personal Digital Assistant operating system such as Microsoft CE™, or other operating system. The choice of operating system, and even to the use of an operating system, is not critical to the invention.

I/O device(s) 625 may comprise one or more input/output devices that allow data to be received and/or transmitted by system 600. For example, I/O device 625 may include one or more input devices, such as a keyboard, touch screen, mouse, and the like, that enable data to be input from a user. Further, I/O device 525 may include one or more output devices, such as a display screen, CRT monitor, LCD monitor, plasma display, printer, speaker devices, and the like, that enable data to be output or presented to a user. I/O device 625 may also include one or more digital and/or analog communication input/output devices that allow computing system 600 to communicate, for example, digitally, with other machines and devices. Other configurations and/or numbers of input and/or output devices may be incorporated in I/O device 625.

In the embodiment shown, system 600 is connected to a network 635 (such as the Internet, a private network, a virtual private network, or other network), which may in turn be connected to various systems and computing machines (not shown), such as servers, personal computers, laptop computers, client devices (e.g., the client computer 120), etc. In general, system 600 may input data from external machines and devices and output data to external machines and devices via network 635.

In the exemplary embodiment shown in FIG. 6, database 630 is a standalone database external to system 600. In other embodiments, database 630 may be hosted by system 600. In various embodiments, database 630 may manage and store data used to implement systems and methods consistent with the invention. For example, database 630 may manage and store data structures that implement traffic management tables 245, rules tables 310, 320, 330, or 350 and/or tables 410, 420, and/or 430, etc. and/or status variables that are evaluated against criteria specified by traffic management rules.

Database 630 may comprise one or more databases that store information and are accessed and/or managed through system 600. By way of example, database 630 may be an Oracle™ database, a Sybase™ database, or other relational database. Systems and methods consistent with the invention, however, are not limited to separate data structures or databases, or even to the use of a formal database or data structure.

One of ordinary skill will recognize that the components and implementation details of the system in FIG. 6 are examples presented for conciseness and clarity of explanation. Other components and implementation details may be used.

Although many of the embodiments and implementations in this disclosure are described in the context of DNS queries, the scope of the invention is not necessarily limited to DNS queries and may encompass other types of queries that involve conditional rules to determine one of multiple possible answers, and the like.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method, implemented via a computing system, for managing network traffic, the method comprising:
   receiving, by a resolution server via a network, a set of traffic management rules;
   translating, by the resolution server, each traffic management rule of the set of traffic management rules into corresponding entries in one or more traffic management tables, wherein each traffic management rule of the set of traffic management rules corresponds to one or more rows in the one or more traffic management tables;
   receiving, by the resolution server, a Domain Name System (DNS) query from a client computer via the network, wherein the DNS query includes a domain name and resource record type;
   upon receiving the DNS query, searching, by the resolution server, an initial traffic management rule in one of the one or more traffic management tables without executing a traffic management script, based on the domain name and resource record type as a search key, wherein the initial traffic management rule specifies a first variable that affects a DNS answer;
   iterating, based on the initial traffic management rule, until the DNS answer to the DNS query is found, wherein the iterating comprises:
      fetching, via the computing system, a value for another variable specified in a successive traffic management rule obtained from one of the one or more traffic management tables; and
      searching, via the computing system, in one of the one or more traffic management tables the DNS answer or another successive traffic management rule based on the domain name, and the value for the another variable of the successive traffic management rule as a search key; and
   transmitting, by the resolution server, the DNS answer to the client computer.

2. The method of claim 1, wherein the initial traffic management rule is a DNS traffic management rule corresponding to a first plurality of rows in the one or more traffic management tables.

3. The method of claim 2, wherein:
   the successive traffic management rule is a DNS traffic management rule corresponding to a second plurality of rows in the one or more traffic management tables; and
   the another successive traffic management rule is a DNS traffic management rule corresponding to a third plurality of rows in the one or more traffic management tables.

4. The method of claim 1, further comprising:
   searching the one of the one or more traffic management tables for a plurality of resource records corresponding to the domain name and resource record type; and
   wherein transmitting the DNS answer to the client computer further comprises transmitting the plurality of resource records to the client computer.

5. The method of claim 1, further comprising:
   searching in the one of the one or more traffic management tables, using the value for the another variable as a search key, information corresponding to the domain name and resource record type in addition to the DNS answer; and
   transmitting the information to the client computer.

6. The method of claim 1, wherein the one of the one or more traffic management tables includes:
   a plurality of indicators relating the initial traffic management rule,
   the successive traffic management rule, and
   the another successive traffic management rule.

7. The method of claim 6, wherein the initial traffic management rule, the successive traffic management rule, and the another successive traffic management rule correspond to different traffic management scenarios.

8. The method of claim 1, wherein the one of the one or more traffic management tables is configurable by an owner of the domain name.

9. The method of claim 1, wherein searching the initial traffic management rule comprises:
   matching the domain name and the resource record type with a corresponding a first domain name and a first resource record type recorded in a first row included in one of the one or more traffic management tables; and
   fetching a first value for the first variable specified in the first row, wherein the first value comprises a rule type.

10. The method of claim 9, further comprising:
   generating, by the resolution server, a random number for the DNS query based on the first value, wherein the random number is applied against a query percentage in one of the one or more traffic management tables,
   wherein the iterating further comprises determining, by the resolution server based on the random number, whether the domain name and the resource record type match a second domain name and resource record type recorded in a second row in the one or more traffic management tables.

11. The method of claim 1, further comprising:
   precomputing, by the resolution server, a set of Domain Name System (DNS) signatures for a set of answers included in the one or more traffic management rule tables; and
   storing, the set of DNS signatures in the one or more traffic management tables.

12. A non-transitory computer-readable medium containing instruction that when executed by a processor implement operations comprising:
   receiving, via a network, a set of traffic management rules;
   translating each traffic management rule of the set of traffic management rules into corresponding entries in one or more traffic management tables, wherein each traffic management rule of the set of traffic management rules corresponds to one or more rows in the one or more traffic management tables;
receiving a Domain Name System (DNS) query from a client computer via the network, wherein the DNS query includes a domain name and resource record type;
upon receiving the DNS query, searching, an initial traffic management rule in one of the one or more traffic management tables without executing a traffic management script, based on the domain name and resource record type as a search key, wherein the initial traffic management rule specifies a first variable that affects a DNS answer;
iterating, based on the initial traffic management rule, until the DNS answer to the DNS query is found, wherein the iterating comprises:
fetching a value for another variable specified in a successive traffic management rule obtained from the one of the one or more traffic management tables; and
searching in the one of the one or more traffic management tables the DNS answer or another successive traffic management rule based on the domain name and the value for the another variable of the successive traffic management rule as a search key; and
transmitting the DNS answer to the client computer.

13. The non-transitory computer-readable medium of claim 12, wherein the initial traffic management rule is a DNS traffic management rule corresponding to a first plurality of rows in the one or more traffic management tables.

14. The non-transitory computer-readable medium of claim 13, wherein:
the successive traffic management rule is a DNS traffic management rule corresponding to a second plurality of rows in the one or more traffic management tables; and
the another successive traffic management rule is a DNS traffic management rule corresponding to a third plurality of rows in the one or more traffic management tables.

15. The non-transitory computer-readable medium of claim 12, further comprising:
searching the one of the one or more traffic management tables for a plurality of resource records corresponding to the domain name and resource record type; and
wherein transmitting the DNS answer to the client computer further comprises transmitting the plurality of resource records to the client computer.

16. The non-transitory computer-readable medium of claim 12, the operations further comprising:
searching in the one of the one or more traffic management tables, using the value for the another variable as a search key, information corresponding to the domain name and resource record type in addition to the DNS answer; and
transmitting the information to the client computer.

17. The non-transitory computer-readable medium of claim 12, wherein the one of the one or more traffic management tables includes:
a plurality of indicators relating the initial traffic management rule,
the successive traffic management rule, and
the another successive traffic management rule.

18. The non-transitory computer-readable medium of claim 17, wherein the initial traffic management rule, the successive traffic management rule, and the another successive traffic management rule correspond to different traffic management scenarios.

19. A system for managing network traffic, the system comprising:
a memory containing instructions; and
a processor, operably connected to the memory, that executes the instructions to perform operations comprising:
receiving, via a network, a set of traffic management rules;
translating each traffic management rule of the set of traffic management rules into corresponding entries in one or more traffic management tables, wherein each traffic management rule of the set of traffic management rules corresponds to one or more rows in the one or more traffic management tables;
receiving a Domain Name System (DNS) query from a client computer via the network, wherein the DNS query includes a domain name and resource record type;
upon receiving the DNS query, searching an initial traffic management rule in one of the one or more traffic management tables without executing a traffic management script, based on the domain name and resource record type as a search key, wherein the initial traffic management rule specifies a first variable that affects a DNS answer;
iterating, based on the initial traffic management rule, until the DNS answer to the DNS query is found, wherein the iterating comprises:
fetching a value for another variable specified in a successive traffic management rule obtained from the one of the one or more traffic management tables; and
searching in the one of the one or more traffic management tables the DNS answer or another successive traffic management rule based on the domain name and the value for the another variable of the successive traffic management rule as a search key; and
transmitting the DNS answer to the client computer.

20. The system of claim 19, further comprising:
searching the one of the one or more traffic management tables for a plurality of resource records corresponding to the domain name and resource record type; and
wherein transmitting the DNS answer to the client computer further comprises transmitting the plurality of resource records to the client computer.

21. The system of claim 19, the operations further comprising:
searching in the one of the one or more traffic management tables, using the value for the another variable as a search key, information corresponding to the domain name and resource record type in addition to the DNS answer; and
transmitting the information to the client computer.

22. The system of claim 19, wherein:
the one of the one or more traffic management tables includes:
a plurality of indicators relating the initial traffic management rule,
the successive traffic management rule, and
the another successive traffic management rule; and
the initial traffic management rule, the successive traffic management rule, and the another successive traffic management rule correspond to different traffic management scenarios.

* * * * *